United States Patent [19]

Crowley

[11] 4,034,185
[45] July 5, 1977

[54] ELECTRIC BLANKET CONTROL CIRCUIT
[75] Inventor: George C. Crowley, Winnetka, Ill.
[73] Assignee: Northern Electric Company, Chicago, Ill.
[22] Filed: Sept. 2, 1975
[21] Appl. No.: 609,243
[52] U.S. Cl. .............................. 219/212; 219/494; 361/103
[51] Int. Cl.² ...................... H02H 1/02; H05B 3/34
[58] Field of Search ............. 317/18 R, 18 A, 9 A, 317/9 D, 40 R, 41, 124, 132, 40 A; 219/212, 494, 504, 505; 340/228

[56] References Cited
UNITED STATES PATENTS

| 3,418,454 | 12/1968 | Ryckman, Jr. | 219/504 |
| 3,594,788 | 7/1971 | Seelig | 340/228 |
| 3,628,093 | 12/1971 | Crowley | 317/18 A |
| 3,673,381 | 6/1972 | Crowley et al. | 219/212 |

Primary Examiner—Robert J. Hickey
Attorney, Agent, or Firm—George R. Clark; Neil M. Rose; John S. Pacocha

[57] ABSTRACT

An electric blanket control circuit is provided which includes an overheat protection circuit to detect an overheat condition as well as a fail-safe testing circuit to assure that the electrical components in said overheat protection circuit are properly functioning. A simulation circuit is provided to electrically simulate an overheat condition in the blanket. An on-off switch is provided which will consecutively activate the overheat simulation circuit and then the fail-safe testing circuit so that said circuits are activated each time the electric blanket is turned off by the user.

15 Claims, 4 Drawing Figures

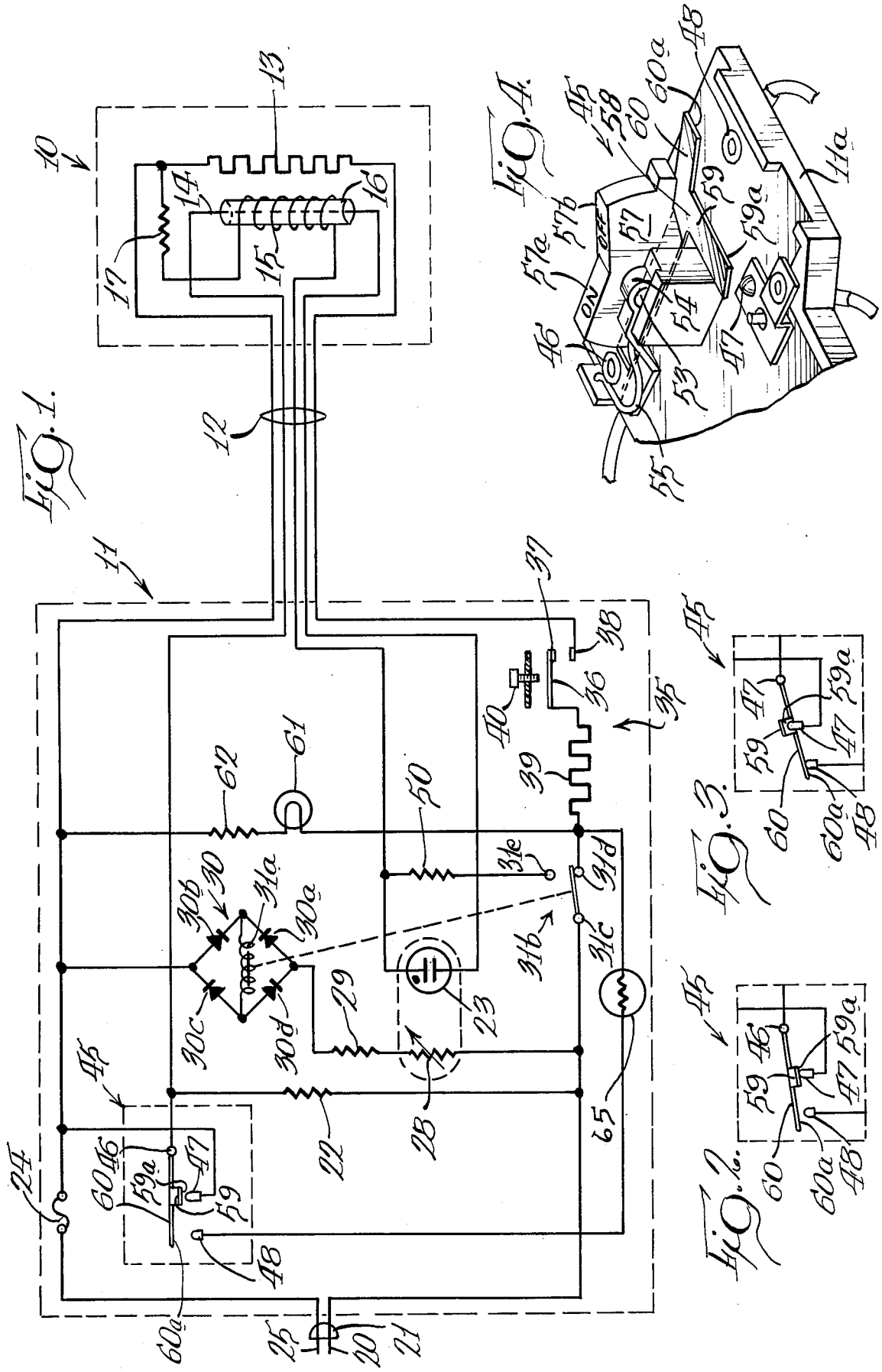

ELECTRIC BLANKET CONTROL CIRCUIT

BACKGROUND OF THE INVENTION

This invention relates in general to an overheat protection system for an electric heating appliance such as an electric blanket and in particular to a temperature protection system which is always effective as well as containing a fail-safe circuit to automatically test the various electrical components and assure that they are functioning properly. In electrical appliances such as electric blankets, it is imperative that protective devices be provided so that the blanket cannot become overheated, causing fire or injury to the user. At one time it had been customary to mount a number of small bimetallic thermostats to sense the temperature at particular locations throughout the blanket. The thermostats were physically spaced along the heating element and electrically connected in series therewith. Such heating elements typically comprised an elongated insulated resistance wire element which was mounted between the layers of the blanket material and disposed in a tortuous configuration to deliver heat uniformly throughout the blanket. If any of the thermostats were subject to an overheat condition the thermostat would open disconnecting power to the electric blanket heating element. However, if an overheat condition existed at a location where no thermostat was mounted, it was possible that such an overheat condition could exist which could not be detected by any thermostat to turn the power to the blanket off.

To correct this situation it then became common to utilize pairs of coaxially wound conductors which formed a part of the heating circuit or a separate sensing circuit. These conductors were insulated from each other under normal temperature operating conditions by a temperature responsive material which would decrease in resistance to establish a lower resistance electrical path between the conductors if an overheat condition occurred. Such an overheat protection system for an electric blanket is disclosed in Crowley U.S. Pat. No. 3,628,093, assigned to the same assignee as the present application.

Blanket control circuits making use of the type of heat sensitive material mentioned above were subsequently developed which completely eliminated the use of any thermostats, thus being termed thermostatless blanket control circuits, and which included relatively inexpensive and uncomplicated thermal overload circuits. One such blanket control circuit is described in the Crowley et al copending U.S. Reissue application Ser. No. 488,213, now U.S. Pat. Re. No. 28,656, also assigned to the same assignee as the present invention. This latter type of blanket control circuit is advantageous in that it replaced the previously used bimetallic thermal switches which were capable of handling only a small amount of power, tended to be overly sensitive and difficult to manufacture and were not as reliable. Although the various circuits used in the thermostatless blankets had advantages over previously used electric blanket control circuits, these thermostatless blanket circuits were not completely fail-safe in that if one or more components failed by an open circuit or short circuit or changed in value, this failure or change in value might cause the control to keep the blanket on at all times even if an overheat condition occurred. Accordingly, it is of great importance to provide some fail-safe device and/or test circuit which would prevent over-heating in the case of a malfunction in the control circuit and make certain that the control circuit components were continuously operating properly.

SUMMARY OF THE INVENTION

The present invention provides an improved electric blanket control circuit which is relatively simple to manufacture and at the same time is completely effective in detecting overheat conditions and furthermore includes fail-safe features which have heretofore not been available. The invention involves an overheat protection system using a heat sensitive material together with a neon light and light sensitive resistor as disclosed in the aforementioned copending Crowley et al application together with an internal test circuit which is operated each time the blanket is turned on or off or both such that the control components would be tested to make certain that they are operating properly each time the blanket is used. Specifically, if there is a failure in one of the components in the overheat protection circuit, such malfunction will probably occur with respect to the neon light/light sensitive resistor combination or the relay being used. Thus, the present invention makes use of an additional test circuit which will simulate an overheat condition and if any of these components are not properly functioning so as to electrically disconnect the blanket heating element, a fuse provided will automatically break down. This additional test circuit is designed so that it will be automatically activated each time the blanket is used and specifically, in the present embodiment, it will be activated each time the blanket is turned from its "on" to its "off" position.

It is an object of the present invention to provide a more reliable thermostatless overheat protection system for an electric blanket.

It is a further object of the present invention to provide an efficient overheat protection system with a backup fail-safe system.

It is another object of the present invention to provide an internal test circuit to test for component failures every time the subject blanket is used.

It is still a further object of the present invention to simulate electrically an overheat condition in an electric blanket in order to determine that the blanket overheat protection system is properly functioning.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWINGS

FIG. 1 is a schematic diagram of an embodiment of the present invention.

FIG. 2 is a schematic representation of the on/off switch of FIG. 1, shown in a second electrical position;

FIG. 3 is a schematic representation of the on/off switch shown in FIG. 1 and FIG. 2 shown in its third electrical position; and FIG. 4 is a perspective view of the on/off switch schematically shown in FIGS. 1, 2 and 3.

DESCRIPTION OF THE PREFERRED EMBODIMENT

Referring now to the drawings, there is shown in FIG. 1 a schematic view of the overheat protection system wherein an electric blanket is designated generally by reference numeral 10 and control means for said electric blanket incorporating the circuit of the present invention is designated generally by reference numeral 11. A five-conductor wire 12 is provided which connects the electric blanket 10 to the control means 11. The electric blanket 10 is constructed in a somewhat conventional manner in that it has a heating wire 13 and a pair of sensing wires 14 and 15. The blanket is manufactured of several layers of material secured together to form channels, each channel being approximately 1½ inches wide and spaced and half inch apart. The heating wire 13 is positioned so that it goes through each channel located between the layers of the blanket whereas the sensing wires 14 and 15 are placed in every second channel alongside the heating wire 13. The sensing wires 14 and 15 are separated from each other by a heat sensitive material 16 which has a decreased resistance with increasing temperature. That is, at normal operating temperatures, heat sensitive material 16 will effectively act as an insulator between the sensing wires 14 and 15 whereas when an overheat condition occurs in the blanket 10 the resistance of the heat sensitive material will decrease substantially creating a low impedance electrical path between the two sensing wires. This type of heat sensitive material is more fully described in the Jacoby U.S. Pat. No. 2,941,176 and Spooner et al U.S. Pat. No. 2,581,212.

Although the details of the subject invention will be fully described below, a brief and functional consideration of the operation of the blanket will be presented first. It can be seen from FIG. 1 that there is provided a switch 45 used to turn the blanket "on" or "off". When the switch is in its "on" position, as schematically shown in FIG. 1, a current path is established to the heating element 13 so that the blanket will heat up to the desired temperature. This current path is established through three separate phases which will also be fully described below. As switch 45 is turned from its "on" position to its "off" position, an intermediate electrical position is momentarily made. That is, although switch 45 has two stable mechanical positions, "on" or "off", three electrical positions are established: the first electrical position schematically shown in FIG. 1 represents the "on" position, the second electrical configuration schematically represented in FIG. 2 represents the momentary intermediate position, and the third electrical position, corresponding to the mechanical "off" position, is schematically represented in FIG. 3. In the second electrical position shown in FIG. 2, an overheat condition is electrically simulated which under normal conditions will cause the current path to the heating element to open and thus turn off the blanket. In the third electrical position of switch 45, schematically represented in FIG. 3, a test circuit is established so that if for some reason a malfunction has occurred within the overheat protection circuit and the heating element was not turned off as described above, a fuse will break down warning the user of the malfunction and further eliminating the risk of any possible injury due to such malfunction.

As indicated above, power is supplied to the electric blanket 10 and heating element 13 contained therein in three consecutive steps or phases. That is, the first phase provides current to a neon light 23, causing it to glow. The second phase or circuit is established when light from the neon light reaches a light sensitive resistor 28 thereby substantially reducing the resistance of said resistor which will effectively act as a switch to allow current to flow therethrough. Finally, the third phase in supplying power to the heating element 13 is established when current flowing through the resistor 28 passes through a relay coil 31a, thereby closing a relay switch 31b to complete the circuit to the heating element.

With the switch 45 in its "on" position, as schematically represented in FIG. 1, an electric current path is first established starting from the prong 20 of a standard power plug 21, through a keep warm resistor 22, the sensing wire 14, the neon light 23, the sensing wire 15, a sensitivity resistor 17, a fuse 24 and finally ending at the upper prong 25 of plug 21. When the blanket is being used, the power plug 21 is inserted into a conventional power supply, as for example 120 volts AC. Thus, as shown and just described, the circuit path established by this first phase will provide a current through the neon light 23 which causes the gas in said neon light to be excited and glow.

Combined in a sealed package with the neon light 23 is a light sensitive resistor 28. The characteristics of said resistor are that it will have a very high resistance, typically on the order of 10 megaohms when dark and a very low resistance, in the range of 300 to 1000 ohms when subjected to light. Thus, when light is emitted from neon light 23 it will cause the resistance of resistor 28 to decrease substantially and in effect act as a switch establishing a new current path. This new current path, being phase two in turning on the blanket, establishes a current path from prong 20 of plug 21, through the resistor 28 which, being subjected to light emitting from neon light 23 now has a low resistance, through a voltage dropping resistor 29, a full wave rectifier designated generally by reference numeral 30, a coil 31a of a standard relay 31, and finally through fuse 24 and prong 25 of plug 21. The current provided from a conventional power supply is alternating current so that in this second phase one-half cycle will take a path in the rectifier 30 represented through a diode 30a, through the coil 31a, and then out through a diode 30c whereas the other half cycle will take the reverse path from a diode 30b through the coil 31a and then out through a diode 30d.

As current flows through the coil 31a it will cause a relay switch 31b to be closed making an electrical connection between contact 31c and 31d. When this connection is made it will establish the third and final phase in turning the electric blanket 10 on the provide a current path through the heating element 13.

The normal position of the relay switch 31b is such that without any current through the relay coil 31a, an electrical connection is made between 31c and 31e. As the coil 31a is energized, described above in phase 2, the relay switch 31b is thrown and a current path is established from prong 20 of plug 21 to contact 31c, through switch 31b to contact 31d, and through a conventional adjustable ambient control mechanism reference generally by numeral 35 located between contact 31d and the heating wire 13, through the heating wire 13, and finally out through fuse 24 and prong 25. This ambient cycling control or comfort circuit includes a bimetallic element or plate 36, contacts 37 and 38, a series heater 39, and an adjusting screw 40. The ambient control will cycle the current to the heating element 13 as a function of the room temperature and setting of the adjusting screw 40. The ambient control operates in a conventional manner in that if the room temperature decreases, the bimetallic element 36 causes contacts 37 and 38 to close and current is supplied to the blanket 10 through the series heater 39. After some time the series heater 39 causes the temperature to rise in the bimetallic element 36 and the contacts 37 and 38 are opened. The ambient control mechanism 35 will continue to cycle as long as the room temperature is at or lower than the temperature at which the bimetallic element will cause closing of the contacts 37 and 38. The adjustment screw 40 permits manual adjustment of the bimetallic element 37 to obtain the desired blanket temperature.

In summary, three distinct phases or circuits have been described which enable current to be supplied to the heating element 13 turning on the electric blanket: First, a current path is provided through the neon light 23; the light emitting from light 23 then cause the resistance in resistor 28 to reduce which in turn allows a current path through the relay coil 38a; and finally, after current is established through said relay coil, the relay contact switch is thrown making a path through the ambient control mechanism 35 and through the heating element 13.

As described above there is provided a switch generally designated as numeral 45 used to turn the electric blanket on or off. The switch 45 is shown schematically in its three electrical positions in FIGS. 1, 2 and 3 whereas the actual physical characteristics of this switch are shown in FIG. 4. As best seen in FIG. 4, switch 45 includes a manual control 57 shown as a rocker type switch control with two stable mechanical positions. This switch control 57 is pivoted on a pivot shaft 58 which is held in place by a metal from 54 and the entire assembly is mounted on a portion 11a of the control means 11. A spring 55 is provided abutting the rear portion of control 57 to create the pressure for an overcenter spring mechanism to create the aforementioned two stable positions of said swtich. Also secured to the portion 11a by means of a rivet 46 is a somewhat T-shaped switch member 58 having switch arms 59 and 60 and being engaged by the control 57. When portion 57a of switch control 57 is depressed, the electric blanket will be in its typical "on" position, whereas when side 57b of control 57 is depressed, the switch will be in its "off" position.

As previously described, switch 45 has only two stable mechanical positions, being "on" or "off", however, there are three distinct electrical configurations made and shown schematically in FIGS. 1, 2 and 3. As the rocker control 57 of switch 45 is depressed to its "off" position it will force metal arms 59 and 60 downward so that portion 59a of arm 59 will abut a contact 47 and portion 60a of arm 60 will abut a contact 48. Due to the elevated position of contact 47 an electrical connection will be made between portion 59a and contact 47 before the connection is made between portion 60a and contact 48. Thus, although the user will only perceive two stable mechanical positions of the on/off switch 45, it can be seen that in turning the blanket from its "on" position to its "off" position, three sequential electrical positions are in fact established.

When an overheat condition occurs in the blanket, power should be automatically disconnected from the heating element 13. This is accomplished in that when the overheat condition occurs, the resistance of the heat sensitive material 16 decreases as previously described and establishes a low impedance current path between the sensing wires 14 and 15. As seen from the schematic drawing in FIG. 1, this low impedance path of the heat sensitive material 16, in parallel with the neon light 23, will cause a drop in voltage across said neon light so that it will stop glowing and become dark. Once the neon ceases to emit light the resistance of the light responsive resistor 28 will substantially increase limiting the current flowing therethrough and through the relay coil 31a. Thereupon, the relay switch 31b will spring back to its normal position breaking the electrical connection between contacts 31c and 31d and thus break the electrical connection to the heating element 13 of the electric blanket 10. The sensitivity resistor 17 is provided in order to regulate the general sensitivity of the overheat protection circuit. That is, the sensitivity resistor 17, as previously described and shown in FIG. 1, is electrically connected in series with the parallel combination of the heat sensitive material 16 and neon light 23. Thus, with constant voltage maintained across the neon light while glowing, the resistor 17 will effectively establish the current level passing through said heat sensitive material/neon light parallel combination. This will then establish the sensitivity of the overheat protection circuit by setting the current level which must pass through the heat sensitive material 16, that is, the resistance value it must attain, in order to turn off the neon light 23.

Also provided in the circuit of the present invention is a resistor 50 between contact 31e of the aforementioned relay and the sensing wire 15 in order to prevent chattering of the relay as the heat sensitive material 16 cools down once the blanket has been turned off. Furthermore, an indicating lamp 61 and a correspondingly appropriate resistor 62 is provided in parallel with the heat element 13 and indicates to the user when the blanket is on.

In normal operation when the user wishes to turn the blanket off he depresses portion 57b of the switch control 57 and in doing so an electrical connection is first established between portion 59a of arm 59 and contact 47 as previously described and shown in FIG. 2. As further seen from the schematic diagram of FIG. 1, when the connection is made it will establish a direct current path from prong 20 of plug 21 through the keep warm resistor 22 and out through the fuse 24 to prong 25. Thus, this current path will short out the circuit previously established providing a current through the sensing wires 14 and 15 and to the neon light 23. In this respect the intermediate electrical position establishes in turning off the blanket will electrically simulate an overheat condition by shutting off the neon light 23 thus causing the resistance of resistor 28 to increase, reducing the current flowing through the relay coil 31a, and further causing relay switch 31b to break the electrical connection between contact 31c and 31d. In this manner, this process should break the current path to the heat element 13 as would an actual overheat condition, and effectively turn off the electric blanket 10.

If there is component failure in the overheat protection circuit such malfunction could keep the blanket on at all times even if an actual overheat condition occurred. That is, considering the components being used in the circuit, if a component failure were to occur it would most likely be with the neon light 23/ resistor 28 combination where outside light was leaking in and keeping the resistance values of resistor 28 low, or for some other reason said resistance value would drop, or with the relay 31 where the switch 31b could fuse to contact 31d. If any of these conditions did occur, power would continuously be supplied to the heating element 13 of blanket 10 even if an overheat condition was properly detected through the sensing wires 14 and 15. With such a failure, the blanket would also remain on when an overheat condition is electrically simulated as described above in the intermediate electrical connection made while turning the blanket to its "off" position.

To check for the proper operation of the overheat protection circuit a testing circuit is provided and is activated when switch 45 reaches its stable "off" position, schematically represented in FIG. 3. Specifically, if there is a component malfunction or if for any other reason relay 31b remains closed making a connection between contacts 31c and 31d, and the switch 45 is subsequently put in the stable "off" position, a circuit is provided whereby a thermistor 65 is placed in series with the fuse 24 with this combination directly across the line voltage. Thus, every time the electric blanket is turned off by the user an overheat condition is electrically simulated when the switch 45 is in its intermediate electrical position; then, if there is a malfunction preventing the proper operation of the overheat protection circuit so that power is continuously supplied to the heating element, such a failure will be detected by the testing circuit and fuse 24 will automatically break down. This testing circuit, activated each time the blanket is turned off, provides a safety backup to test the proper operation of the overheat protection circuit and further avoid possible injury to the user. The reason for using the thermistor 65 in place of a direct electrical connection is to prevent the fuse 24 from breaking down if the relay switch 31b is in fact properly working but is merely delayed for a moment from breaking the connection between contacts 31c and 31d. Thus, by using a thermistor in the test circuit such a momentary delay would not cause the fuse to break down thereby assuring that a break down of said fuse would only occur in the event of an actual malfunction.

In summary, a circuit has been described incorporating the present invention whereby an overheat protection system is established using a pair of sensing wires and a heat responsive material positioned therebetween, said wires and material placed throughout an electric blanket to detect any overheat condition. To provide added safety and assure that the electrical components and connections made to the sensing system of the aforementioned sensing wires and heat responsive material are properly functioning, there is provided a means to electrically simulate an overheat condition and subsequently test that the blanket is properly turned off in response to said simulated overheat condition. This testing feature, as previously described, will be activated each time the blanket is used and specifically in the present embodiment, each time the blanket is turned off.

While there has been shown and described a single embodiment of the present invention, it will be apparent to those skilled in the art that numerous changes and modifications may occur, and it is intended in the appended claims to cover all such changes and modifications which fall within the true spirit and scope of the present invention.

What is claimed as new and desired to be secured by Letters Patent of the United States is:

1. An overheat protection circuit for an electric blanket having a heating means and a sensing means to detect an overheat condition comprising switch means to electrically activate said heating means; said switch means having at least two mechanically stable positions; circuit means to electrically simulate an overheat condition; and said simulating circuit means activated each time said switch means is switched to one of its said stable positions.

2. An overheat protection circuit according to claim 1 wherein said switch means has two stable mechanical positions, an "on" position and an "off" position; and said switch means having three electrical positions.

3. An overheat protection circuit according to claim 2 wherein the first of said three electrical switch positions corresponds to said "on" stable mechanical position; said third electrical switch position corresponding to said "off" stable mechanical position; and said second electrical switch position being made when said switch is between said two stable mechanical positions so that when the electric blanket is mechanically switched from its "on" to its "off" mechanical position, said switch will connect said second electrical position momentarily.

4. An overheat protection circuit according to claim 3 wherein said simulating circuit means is activated when said switch is in the second of said three electrical positions.

5. An overheat protection circuit according to claim 1 comprising circuit means electrically connected to said sensing means to deactivate said heating means when an overheat condition is detected; and testing means to test for a malfunction in said deactivation circuit means.

6. An overheat protection circuit for an electric blanket according to claim 5 wherein said testing means includes a thermistor; a fuse electrically connected in series with said thermistor; and said thermistor and fuse being electrically connected across an input voltage source whereby in the event a malfunction occurs in said deactivation circuit means said fuse will break down.

7. An overheat protection circuit for an electric blanket having a heating means and a sensing means to detect an overheat condition comprising switch means to electrically activate said heating means; said switch means having at least two stable mechanical positions; circuit means electrically connected to said sensing means to deactivate said heating means when an overheat condition is detected; testing means to test for a malfunction in said circuit means; said testing means being operative each time said switch means is switched to one of its said stable mechanical positions; and simulating circuit means to electrically simulate an overheat condition.

8. An overheat protection circuit according to claim 7 wherein said switch means has two stable mechanical positions, an "on" position and an "off" position; and said switch means having three electrical positions, two of which correspond to said stable mechanical positions.

9. An overheat protection circuit according to claim 8 wherein the first of said three electrical switch positions corresponds to said "on" stable mechanical position; said third electrical switch position corresponding to said "off" stable mechanical position; and said second electrical switch position being made when said switch is between said two mechanical positions so that when the electric blanket is mechanically switched from its "on" position to its "off" position, the second electrical position will be momentarily established therebetween.

10. An overheat protection circuit according to claim 9 wherein said simulating circuit means is activated when said switch is in the second of said three electrical positions.

11. An overheat protection circuit according to claim 9 wherein said testing circuit means is activated when said switch is in the third of said three electrical positions.

12. An overheat protection circuit for an electric blanket having a heat means and a sensing means to detect an overheat condition comprising deactivation circuit means electrically connected to said sensing means and including switch means to deactivate said heating means when an overheat condition is detected; a fuse separate from said sensing means connected in circuit with said heating means; and testing means connecting said switch means and said fuse in series across the input voltage source whereby said fuse will break down if said switch means has malfunctioned to test for a malfunction in said deactivation circuit means.

13. An overheat protection circuit according to claim 12 wherein said switch means comprises electrical components including a neon light and a light sensitive resistor positioned to respond to said light and a relay activated by current through said resistor.

14. An overheat protection circuit for an electric blanket having a heating means and a sensing means to detect an overheat condition comprising deactivation circuit means electrically connected to said sensing means to deactivate said heating means when an overheat condition is detected; testing means to test for a malfunction in said deactivation circuit means; said deactivation circuit means comprising electrical components including a neon light and a light sensitive resistor positioned to respond to said light and a relay activated by current through said resistor; said testing means comprises a fuse; a thermistor electrically connected in series with said fuse; and said fuse and thermistor electrically connected across an input voltage whereby in the event a malfunction occurs in one of said components in said deactivation circuit said fuse will break down.

15. An electric blanket having a heating means and an overheat protection circuit comprising a sensing means to detect an overheat condition; first switch means to electrically energize and deenergize said heating means; circuit means including second switch means to deenergize said heating means when an overheat condition is detected by said sensing means; testing means to test for proper functioning of said deenergizing circuit means; said testing means being connected in circuit each time said first switch means is operated to deenergize said heating means; said testing means including circuit means to simulate an overheat condition and to disable said heating means if said second switch means failed to deenergize said heating element in response to the simulated overheat condition.

* * * * *